United States Patent [19]
Reuter

[11] 3,812,891
[45] May 28, 1974

[54] TOOL HEADS FOR USE IN MACHINING TIMBER
[75] Inventor: Alfred Reuter, Oberkirch/Baden, Germany
[73] Assignee: Gebruder Linck, Oberkirch/Baden, Germany
[22] Filed: Nov. 16, 1972
[21] Appl. No.: 307,298

[30] Foreign Application Priority Data
Nov. 27, 1971 Germany............................ 2158912

[52] U.S. Cl................. 144/3 R, 90/12 R, 144/118, 144/176, 144/218
[51] Int. Cl.......................... B27c 9/02, B27l 11/00
[58] Field of Search.......... 144/39, 162 R, 118, 176, 144/218, 116, 37, 41, 220, 240, 221; 408/118; 90/312 R, 18 R

[56] References Cited
UNITED STATES PATENTS
1,723,999   8/1929   Bernard................................ 90/12 X
2,250,670   7/1941   Joy................................ 144/92 UX
3,299,778   1/1967   Amacher....................... 408/118 X
3,627,005   12/1971  Morton................................ 144/39
3,635,267   1/1972   Reuter............................. 144/220 X Primary Examiner—Andrew R. Juhasz
Assistant Examiner—W. D. Bray
Attorney, Agent, or Firm—Brown, Beveridge, DeGrandi & Kline

[57] ABSTRACT

The present specification discloses a tool head for use in machining round timber trunks to produce beams or planks. The tool head includes a tool holder which is arranged concentrically and coaxially of the tool head, the tool holder and tool head being independently rotatably drivable about their common axis, the tool holder being drivable at a higher rotational speed than the tool head. Chipping blades are provided on the periphery of the tool head and finishing blades are provided on the working end of the tool holder. Thus, as a trunk is passed over the working front end of the tool head in a direction perpendicular to the rotational axis of the head, the chipping blades process the trunk and the finishing blades which can move at a higher speed than the chipping blades, smooth the even surface produced by the chipping blades.

7 Claims, 8 Drawing Figures

TOOL HEADS FOR USE IN MACHINING TIMBER

The present invention relates to a tool head for use in machining timber into beams and/or planks, and for thus producing useful shavings.

More particularly the present invention relates to a tool head having chipping blades arranged round its circumference for processing the side segments of a round timber trunk or the like into useful shavings as the trunk passes along the tool head in a direction perpendicular to the axis of rotation of the rotary tool head, the tool head having a tool holder, which is arranged on the front of the tool with blades on its circumference for smoothing the even surface to be produced on the timber trunk. Planks, scantlings etc. can also be worked in this manner.

During the cutting of the side segments of a round timber trunk, i.e., the so-called profile cutting, an even surface is formed on the trunk while the wooden parts which have been cut off, are processed into useful shavings, for instance wood chips. Usually the tool heads used for this process, are shaped like a truncated cone, and the chipping or hacking blades are situated on the conical surface, their foremost front edges producing the even surface on the trunk. During this process, bundles of fibre, especially in the region of branches on the timber, are ripped out and this leads to unevenness in the machined surface.

In order to raise the surface quality of the even surface produced, it is a known practice to provide a tool holder on the front face of the tool head and this tool holder has blades on its circumference for facing the even surface produced on the trunk (Deutsche Offenlegungsschrift Pat. No. 1,955,293). This measure, however, is not sufficient to substantially improve the surface quality because not enough finishing blades can be accommodated to increase the number of shavings and also to obtain small, flat shavings.

The present invention provides a tool head which produces a high surface quality for the machined timber.

According to the present invention there is provided a tool head having a working front end for machining timber trunks, said tool head comprising chipping blades arranged on the periphery of the tool head for processing side segments of a round timber trunk into useful shavings as the trunk is passed over the working front end of the tool head in a direction perpendicular to the rotational axis of the tool head, a tool holder rotatably mounted coaxially and concentrically of the tool head and arranged to be driven at a higher rotational speed than the tool head, and finishing blades provided in the region of the periphery of the tool holder, the tool holder being so arranged that the finishing blades are located at the working front end of the tool head whereby an even surface produced by the tool head can be smoothed by the finishing blades.

In this way, a greater number of shavings is obtained without increasing the number of finishing blades, which number is anyway restricted by constructional dimensions. These finishing shavings are, in particular, relatively short on account of the rapid movement of the finishing blades, the length of the finishing shaving being determined by the rate of feed of the timber trunk and the period of time between instances when a finishing blade engages and works on the timber. Longer shavings, as obtained with slow-moving finishing blades, lower the surface quality of the surface produced.

As a practical measure, the cutting edge of each finishing blade runs parallel to the even wood surface and these cutting edges are graduated axially of the tool head on the circumference of the tool holder. In this way, the wood to be cut by the finishing blades is cut in thin chips by the axially graduated finishing blades, which results in a very good surface quality even when the wood to be cut is relatively thick.

In a further form of the present invention provision is made on several points of the circumference of the tool holder for a gap in the axial graduation between a finishing blade cutting edge which protrudes the furthest axially of the tool holder, and one which is furthest set back. Thus, during a single turn of the fast-running tool holder, the finishing blades work their way forward several times onto the entire depth of wood to be cut, thereby facilitating the mutual tuning of the wood feed speed, rotation speed of the tool holder, the number of blades and the dimensions of the chips produced.

The finishing blades may be adjustable axially of and/or radially of the tool holder. Furthermore, provision can be made for the finishing blades to be spaced radially so close to the innermost front cutting edges of the chipping blades or the tool head, that the finishing blades operate in advance of the chipping blades. The finishing blade cutting edges move on an arc of a circle situated closely inside the arc of a circle described by the innermost front cutting edges of the chipping blades. Thus, the wood held by a chipping blade has already been undercut to a large extent by the finishing blades, so that tears resulting from the hacking action of the chipping blade can no longer continue in the even surface produced on the wood. It can also be of advantage to set the finishing blades back radially so far inside the innermost front cutting edges of the chipping blades that the finishing blades subsequently smooth an even surface produced by the chipping blades. For this method, the driving power required for the finishing tools is relatively little, since the even wood surface has already been produced by the edges of the more slowly rotating chipping blades, though the surface is less smooth, and the finishing blades have subsequently only to smooth this surface.

In a particularly advantageous form of the present invention, further provision is made for the finishing blades to be formed as teeth of a circular saw disc. In this way, using a simple construction, a smooth sawn surface is obtained on the wood though the yield of shavings produced by the circular saw is relatively small. Also, the saw disc can easily be produced and reground.

The present invention will now be further described, by way of example, with reference to the accompanying drawings, in which.

Figure 1:
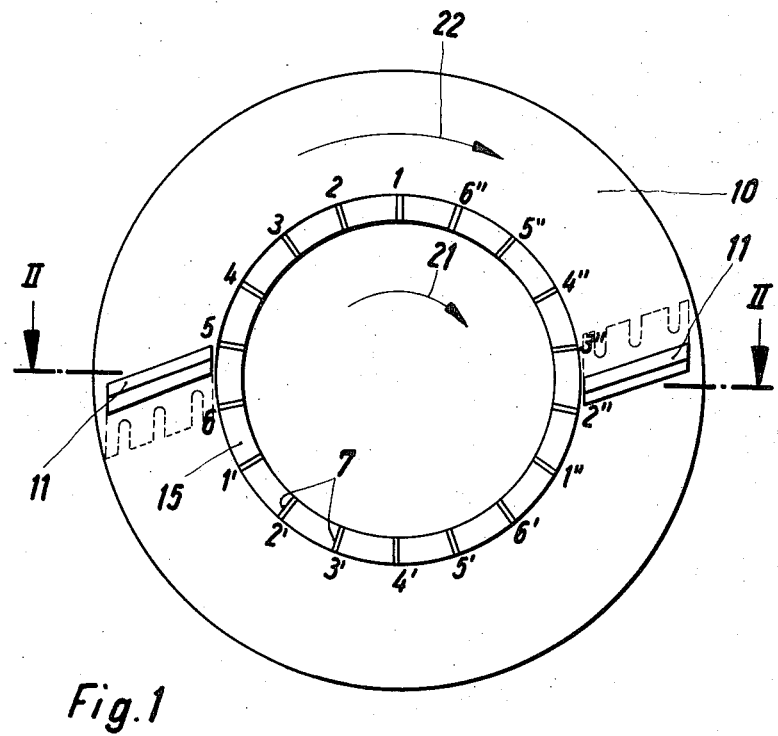
FIG. 1 illustrates a front view of one embodiment of a tool head constructed in accordance with the present invention.

The rotary, driven tool head 10 has two chipping blades 11 on its truncated cone-shaped outer surface, which blades 11 produce useful shavings, e.g. chips for cellulose production, from the side segments of a round timber turnk 13, which is fed perpendicular to the tool head longitudinal axis, in the direction of the arrow 12. After the round timber trunk 13 has passed between two tool heads 10, it is in a form which has been worked on two opposite sides by the opposed working front ends of the tool heads and, when passed through a second time, it can be further processed into a beam or planks or the like.

A central recess 14 is provided in the centre of the tool head 10 for accommodating a disc-shaped tool holder 15. The tool holder 15 is connected to a shaft 16, arranged so as to rotate in the hollow shaft 17 of the tool head 10. The hollow shaft 17 of the tool head 10 and the shaft 16 of the disc-shaped tool holder 15 are arranged to be driven separately at different speeds by means not illustrated in the drawings, whereby a higher rotational speed is selected for the tool holder 15 than for the tool head 10.

Figure 2:
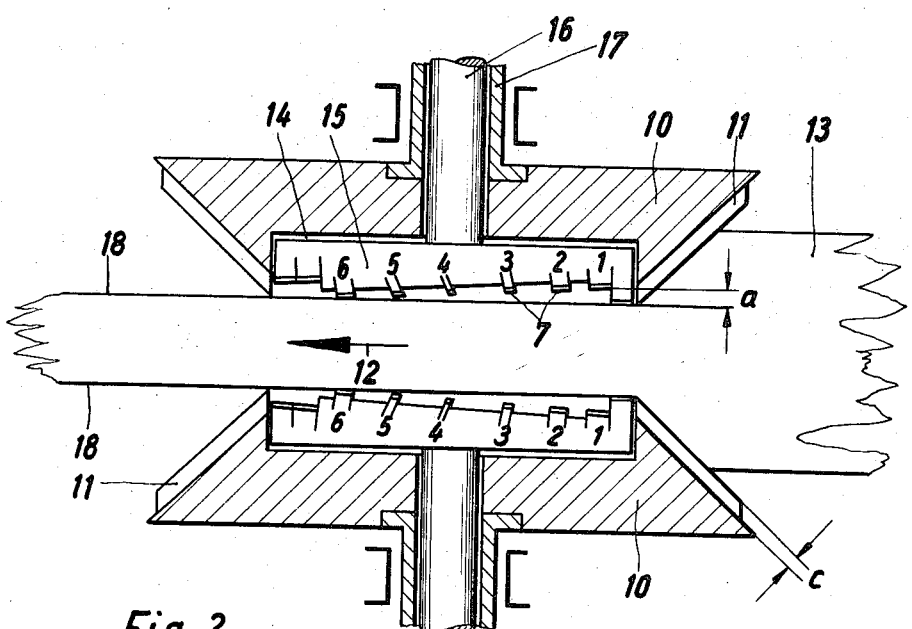
FIG. 2 is a sectional view taken along line 2—2 in FIG. 1 through two opposed tool heads and a timber trunk being processed therebetween.

The tool holder 15 has finishing blades 1 to 6, 1' to 6', and 1'' to 6'' arranged in the region of its perimeter. These blades are used to smooth the even surface 18 of the trunk 13. Each finishing blade has a cutting edge 7, which is arranged to run parallel to the even surface 18 of the wood. These cutting edges 7 are, as can be seen from FIG. 2, graduated in the axial direction of the tool head and the finishing blades in the embodiment shown in FIGS. 1 and 2 form three groups. In the first group, the finishing blade 1 is set back the furthest axially; the next finishing blade 2 projects axially a little further from the head in the direction of the wood trunk and so on; the finishing blade 6 projecting axially the furthest. In like manner, in the second finishing blade group, the blade 1' is set back axially the furthest and the blade 6' projects the furthest; the same applies to the third blade group 1'' to 6''. Thus, in three regions of the circumference of the tool holder a large gap in the axial graduation of the cutting edges 7 is created by a finishing blade 6, 6', 6'' projecting the furthest and a finishing blade 1, 1', 1'' set back the furthest. This gap a corresponds to the greatest possible depth of the wood to be cut by the finishing blades.

Figure 3:
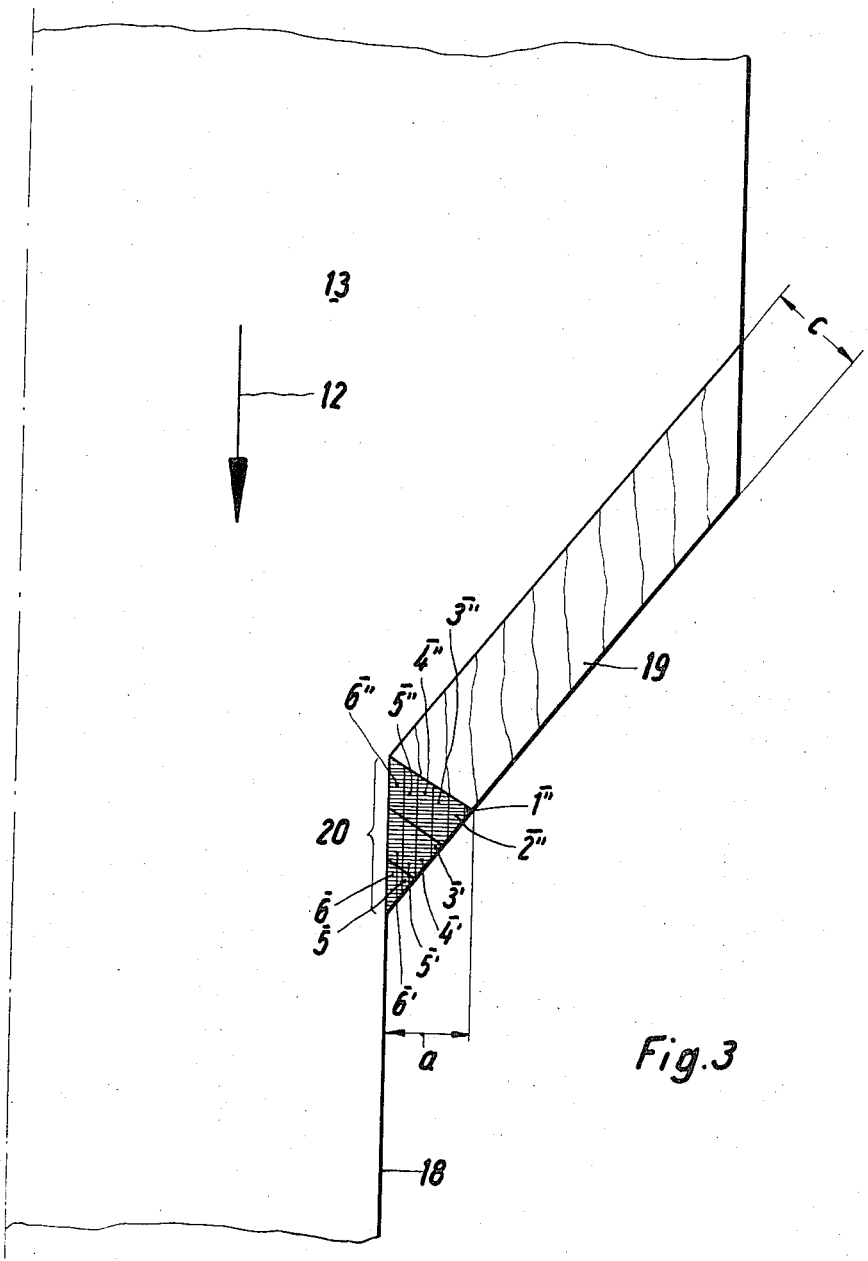
FIG. 3 is a longitudinal section through a timber trunk, which has been cut by a tool head as in FIGS. 1 and 2.
Figure 4:
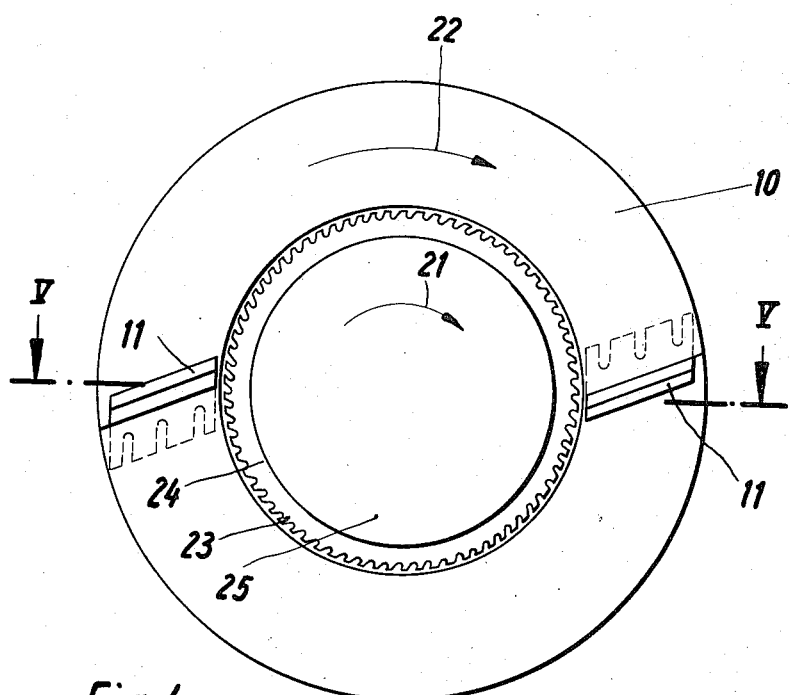
FIG. 4 is a front view of a second embodiment of a tool head constructed according to the present invention, with a circular saw disc.
Figure 5:
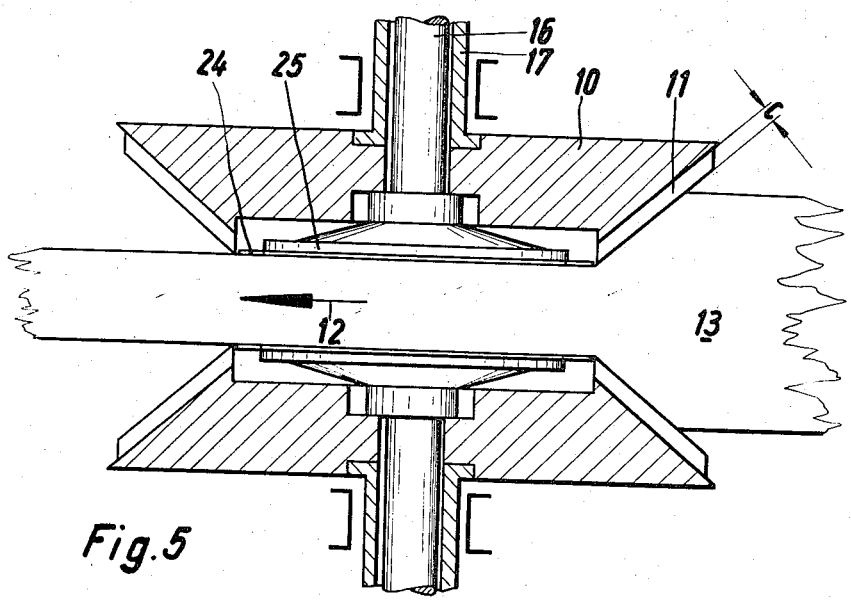
FIG. 5 is a sectional view taken along line 5—5 in FIG. 4 through two tool heads and a timber trunk which is to be chipped.

The mode of operation of the chipping blades 11, which are shaped as hacking blades and run approximately over an entire generating line of the truncated cone-shaped surface of the tool head 10, and the finishing blades 1 to 6, 1' to 6', 1'' to 6'', can best be seen in FIG. 3. The area 19 worked upon by a chipping blade 11 has a breadth c, which, at most, is as great as the height of the chipping blade 11, likewise shown by c in FIG. 2. An area 20, triangular in shape in the section according to FIG. 3, is reduced by the finishing blades to short, thin shavings and the areas cut by the individual finishing blades have the same reference numbers in FIG. 3 as the respective finishing blades only with a cross-bar above; so that, for instance, the area $\overline{1}''$ is cut by the finishing blade $1''$, the area $\overline{6}''$ by the finishing blade $6''$ and so on. When the wood trunk 13 is fed in the direction of the arrow 12, the cutting of the individual areas occurs in the following sequence: $\overline{5}, \overline{6}$ (the finishing blades 1 to 4 have not gripped any wood as yet), $\overline{3}', \overline{4}', \overline{5}', \overline{6}'$ (the finishing blades 1' and 2' have not yet gripped any wood), $\overline{1}'', \overline{2}'', \overline{3}'', \overline{4}'', \overline{5}''$ and $\overline{6}''$.

The area 20, which in section is triangular, is cut accordingly and the wood 19 gripped by the subsequent hacking blade 11 is undercut in the region of the surface 18 to such an extent that any adverse effect on the surface 18 as a result of the hacking process is eliminated. It can be seen from FIG. 3 that the cutters of each finishing blade form an acute angle so that the feeding of the wood does not interfere with the chipping process.

From the above description it is evident that the distribution of the area 20, which is cut by the finishing blades, alters when the ratio of the rotation speed of the tool holder 15 to the time series of the hacking blade 11 alters. For example, it is possible to subdivide the area 20 into an even greater number of (seen in a longitudinal direction of the wood trunk) shorter shavings by an even quicker rotational movement (arrow 21 in FIG. 1) of the tool holder 15 compared to the rotational movement (arrow 22 in FIG. 1) of the tool head 10.

Figure 6:
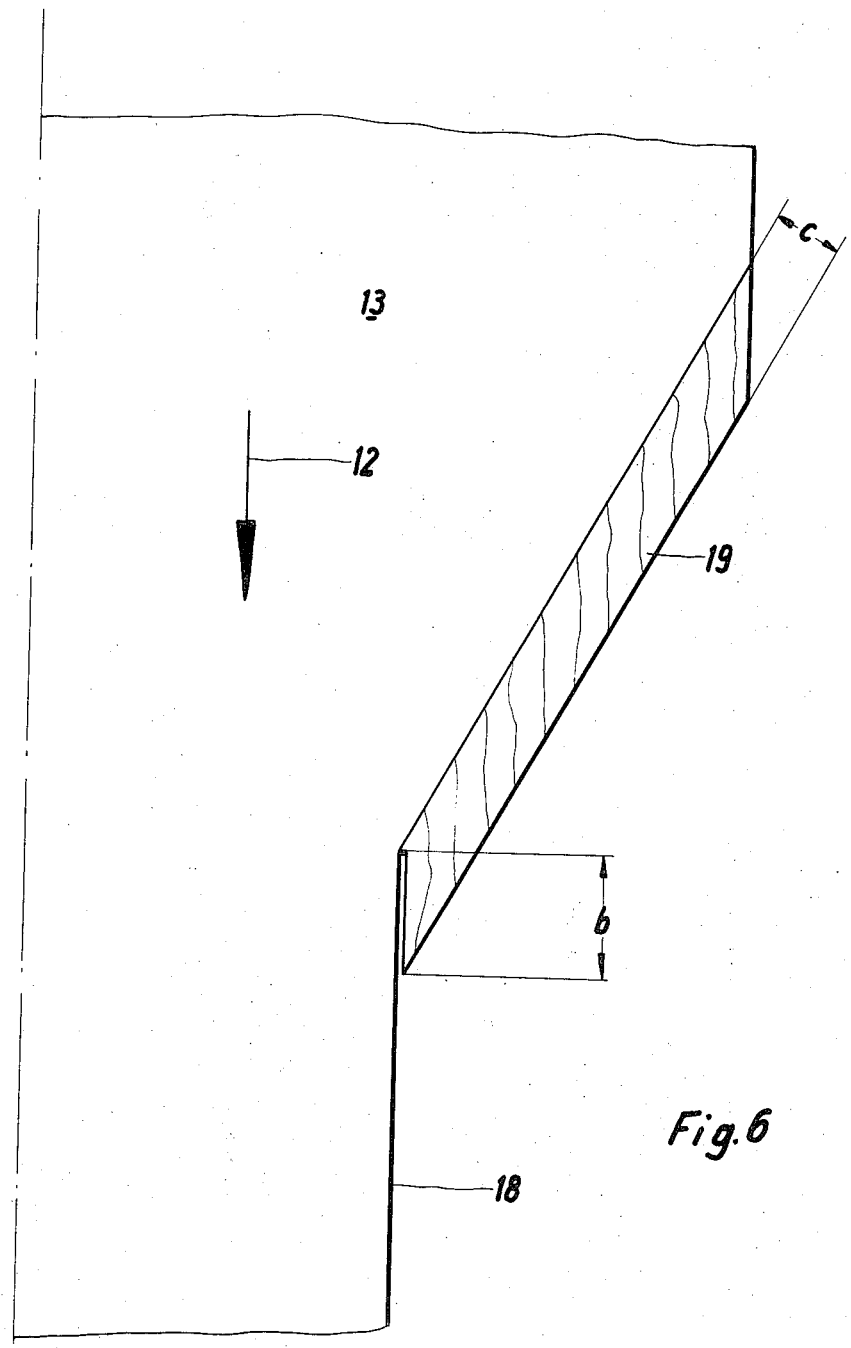
FIG. 6 is a longitudinal sectional view through the timber trunk at the working point of the tool head shown in FIGS. 4 and 5.

In the embodiment according to FIGS. 4, 5, 8 and 9, the finishing blades are formed by the teeth 23 of an annular circular saw disc 24, which is screwed onto the disc-shaped tool holder 25. The circular saw teeth 23 extend radially and lie close to the innermost front cutting edges 26 of the chipping blades 11, so that, like the finishing blades of the embodiment according to FIGS. 1 and 2, they work in advance of the chipping blades 11, as can be seen from FIG. 6. Before a chipping blade cuts the wood area 19 into chips, this area 19 has already been undercut to a depth b by the circular saw disc 24, so that the even surface 18 cannot be damaged by the cutting of the wood area 19. It is also clear from FIG. 6 that the quantity of shavings yielded during the sawing process is very small compared to the quantity of shavings produced in the area 19.

Figure 7:
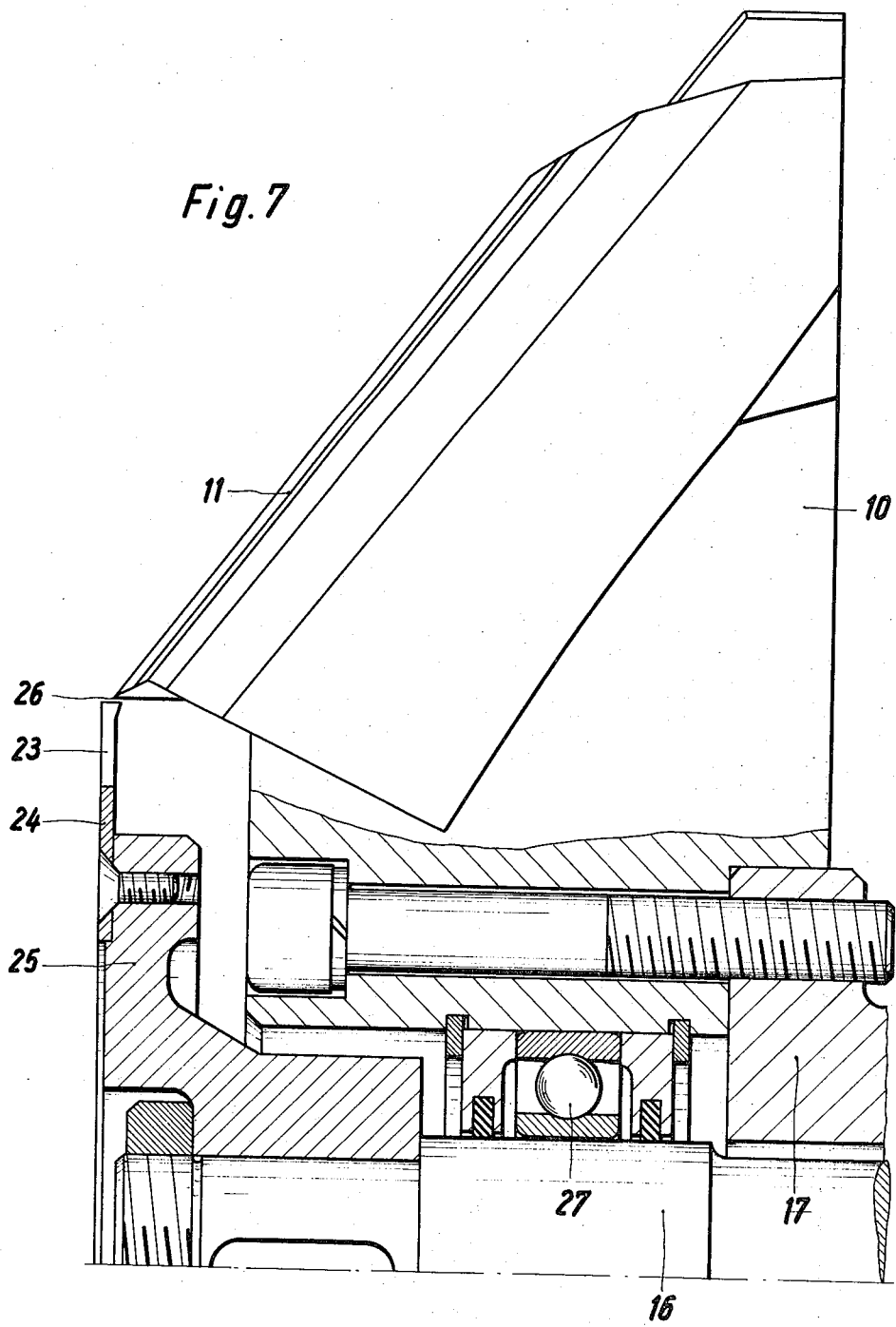
FIG. 7 is a partial section through the tool head of FIG. 4, in which the more quickly driven tool holder carries a circular saw disc.
Figure 8:
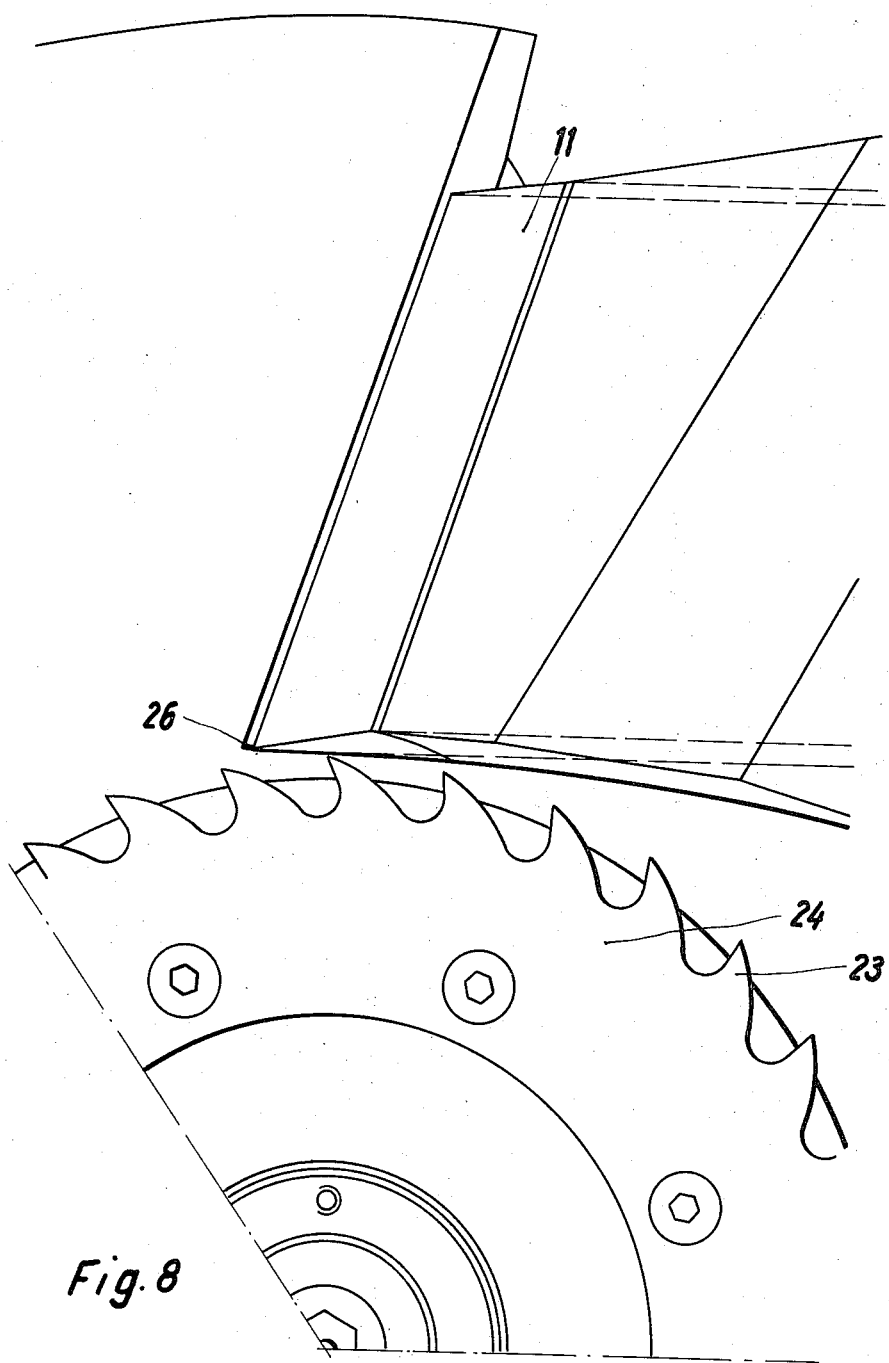
FIG. 8 is a part-front view of the tool head shown in FIG. 7.

FIG. 7 shows the shaft 16 of the tool holder 25 carried in the tool head 10 by means of ball bearings 27.

In the embodiments illustrated, the speed at which the wood trunk 13 is fed must be selected in dependence upon the rotation speed of the tool head 10 and the number of hacking blades 11 in such a way that the timber trunk is advanced by exactly the depth to be cut by a hacking blade before the next hacking blade is applied. An increase in the timber feed speed is therefore possible by increasing the rotation speed of the tool head, which speed is itself, however, limited by the chipping process, or by raising the number of hacking blades 11. The chipping process of the finishing blades does not have a limiting effect on the selection of the timber feed speed because, as it is possible to alter separately the speed of the cutting blades under all operating conditions, a sufficiently smooth surface 18 can be obtained on the piece of timber.

I claim:

1. A tool head having a working front end for machining timber trunks, said tool head comprising chipping blades arranged on the periphery of the tool head for processing side segments of a round timber trunk into useful shavings as the trunk is passed over the working front end of the tool head in a direction perpendicular to the rotational axis of the tool head, a tool holder rotatably mounted coaxially and concentrically of the tool head and arranged to be driven at a higher rotational speed than the tool head, and finishing blades provided in the region of the periphery of the tool holder, the tool holder being so arranged that the finishing blades are located at the working front end of the tool head whereby an even surface produced by the tool head can be smoothed by the finishing blades.

2. A tool head according to claim 1, wherein each finishing blade is arranged so that its cutting edge runs parallel to the even wood surface produced, the cutting edges being graduated axially of the tool head on the circumference of the tool holder.

3. A tool head according to claim 2, wherein on several points of the circumference there is a gap in the axial graduation between a finishing blade cutting edge which protrudes the furthest axially and a finishing blade cutting edge which is furthest set back.

4. A tool head according to claim 1 wherein the finishing blades are axially adjustable.

5. A tool head according to claim 1, wherein the radially innermost front cutting edges of the chipping blades are arranged radially so close to the finishing blades that the finishing blades operate in advance of the chipping blades.

6. A tool head according to claim 1, wherein the finishing blades are set back radially so far inside the radially innermost part of the front cutting edges of the chipping blades that the finishing blades subsequently smooth an even surface produced by the chipping blades.

7. A tool head according to claim 1, wherein a circular saw disc forms the tool holder, the teeth of the circular saw disc forming the finishing blades.

* * * * *